(12) United States Patent
Matthews et al.

(10) Patent No.: US 7,533,422 B2
(45) Date of Patent: May 12, 2009

(54) PLATFORM INDEPENDENT ZERO FOOTPRINT DECOMPRESSION

(75) Inventors: Brian L. Matthews, Kent, WA (US);
Scott Olechowski, Chicago, IL (US);
Cayce M. Ullman, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 10/888,796

(22) Filed: Jul. 9, 2004

(65) Prior Publication Data

US 2006/0020824 A1    Jan. 26, 2006

(51) Int. Cl.
G06F 7/04 (2006.01)
G06F 11/30 (2006.01)
H04L 9/00 (2006.01)
H04L 12/28 (2006.01)
H04L 12/56 (2006.01)
H04L 9/32 (2006.01)

(52) U.S. Cl. .................... 726/27; 713/165; 713/193
(58) Field of Classification Search ............. 713/193, 713/165; 726/27
See application file for complete search history.

(56) References Cited

U.S. PATENT DOCUMENTS 6,041,123 A * 3/2000 Colvin, Sr. ............ 713/153
2003/0088684 A1* 5/2003 Fisher .................. 709/230
2006/0190723 A1* 8/2006 Benson ................ 713/165

FOREIGN PATENT DOCUMENTS

WO  WO 2007043002 A2 * 4/2007

OTHER PUBLICATIONS

Martin Abadi, "Secrecy By Typing In Security Protocols", Sep. 1999, Journal of the ACM (JACM), vol. 46, Issue 5, pp. 749-786.*

* cited by examiner

*Primary Examiner*—Matthew B Smithers
*Assistant Examiner*—Courtney D Fields
(74) *Attorney, Agent, or Firm*—Hickman Palermo Truong & Becker LLP

(57) ABSTRACT

An apparatus, method, and computer-readable medium capable of extracting a payload file or files from a platform-independent, self-extracting, encrypted document. Embodiments include the creation of platform-independent, self-extracting archives that may be encrypted or unencrypted, execution of a platform-independent self-extracting archive.

41 Claims, 5 Drawing Sheets

PLATFORM INDEPENDENT ZERO FOOTPRINT DECOMPRESSION

BACKGROUND

1. Field of the Invention

Aspects of the present invention relate in general to a computer-readable medium, apparatus, and method of generating a self-extracting password-protected document. Further aspects of the present invention include an apparatus, method, and computer-readable medium capable of extracting a payload file or files from a self-extracting encrypted document.

2. Description of Related Art

When communicating over a digital network with limited bandwidth, data is often compressed into archives. However, as multiple compression archive standards and programs exist, it can be confusing for users to determine which library programs are able to decompress certain compressed archives. Indeed, some users that download such archives may not have uncompression programs available at all. This problem is compounded by the fact that many different kinds of devices can connect via the digital network, and archives generated on some device platforms may not work on other devices. For example, an archive created on a Unix workstation may not be extractable on a typical personal computer or personal digital assistant (PDA).

SUMMARY

Embodiments of the present invention include platform-independent embodiments that extract information from self-extracting archives, and embodiments that assemble the self-extracting archives.

Embodiments include a platform-independent method of extracting information from a self-executing file. The file contains an encrypted document session key, an encrypted stored session key cyclic redundancy check, a payload and an extractor. In some embodiments, the file may contain an encrypted stored payload cyclic redundancy check. Using a password, the document session key and the stored session key cyclic redundancy check are decrypted. A cyclic redundancy check is calculated on the document session key. When the cyclic redundancy check on the document session key matches the stored session key cyclic redundancy check, the extractor extracts the payload from the file.

In another embodiment, a computer-readable medium is encoded with a file. The file comprises an encrypted document session key, an encrypted stored session key cyclic redundancy check, a payload and a platform-independent extractor. In some embodiments, the extractor may be computer code configured to extract the payload when the cyclic redundancy check on the document session key matches the stored session key cyclic redundancy check.

In an alternate embodiment, a platform-independent self-executing archive is created when a payload is deposited in a file. A session key is generated, and encrypted with a password. A cyclic redundancy check is performed on the session key, resulting in a session key cyclic redundancy check. The session key cyclic redundancy check is encrypted, and stored along with the encrypted session key, encrypted session key cyclic redundancy check, and the payload in the self-executing file.

DETAILED DESCRIPTION

What is needed is a secure computer-readable medium, apparatus, and method of generating a platform-independent self-extracting ("zero-footprint") password-protected document, file or archive.

Aspects of the present invention include an apparatus, method, and computer-readable medium capable of extracting a payload file or files from a self-extracting encrypted document. Method embodiments include the creation of platform-independent self-extracting archives that may be encrypted or unencrypted. Other method embodiments include the platform-independent execution of a self-extracting archive. Computer-readable medium embodiments may be encoded with a file, that when executed by a computing device results in the uncompressing or "decompressing" of a compressed payload, where a payload is defined as any data stored in an archive.

For the purposes of this application, "documents" are any electronic data known in the art. The term "archive" refers to a file containing one or more documents. The term "platform-independent" means that the executable methods may be run on any number of different types of computers or "platforms."

Figure 1:
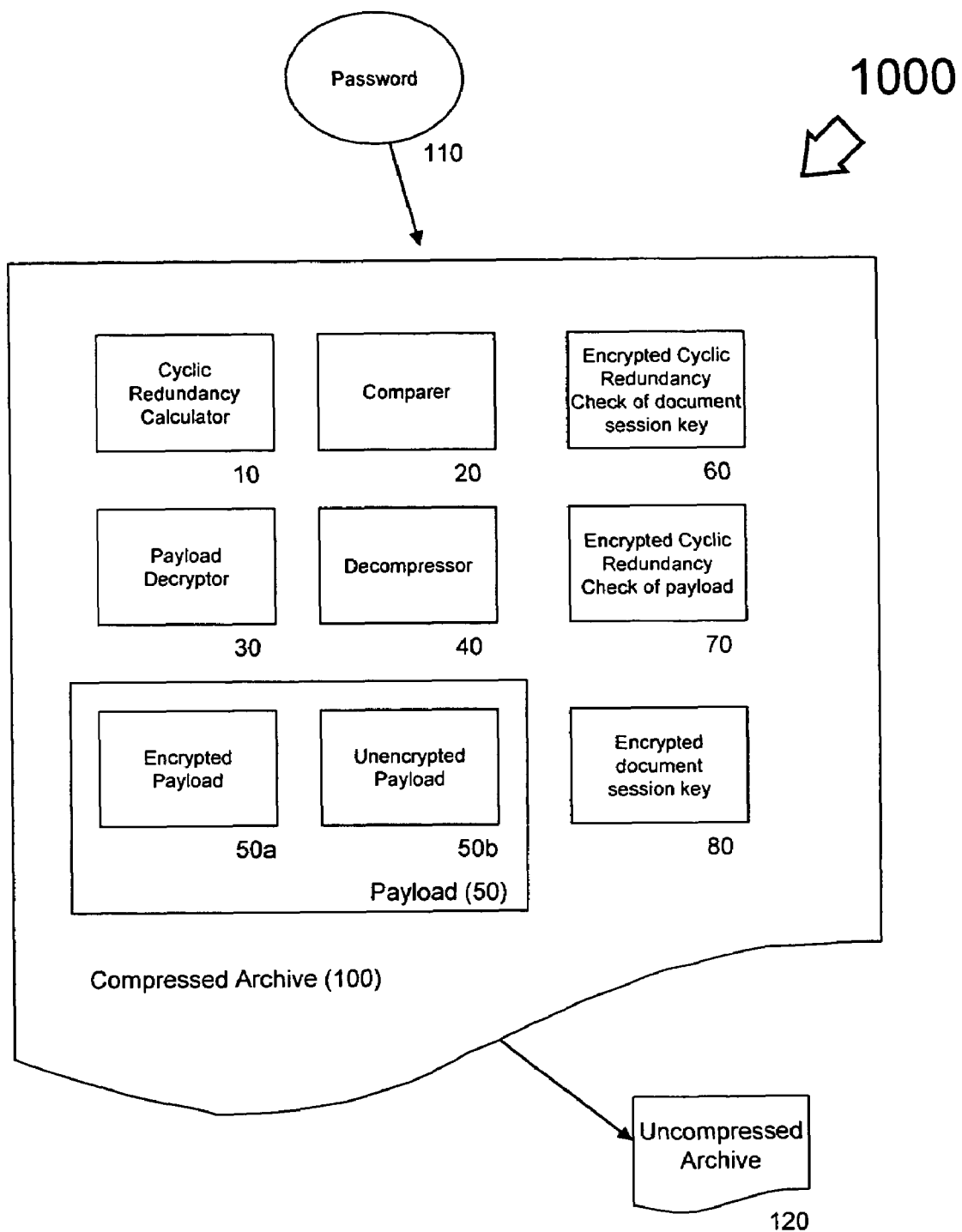
FIG. 1 illustrates an embodiment of a platform-independent system where a password may be used to unlock a compressed archive, resulting in an uncompressed archive.

FIG. 1 illustrates an embodiment of a system 1000 where a compressed archive 100 may be uncompressed, resulting in uncompressed archive 120, constructed and operative in accordance with an embodiment of the present invention. In some embodiments a password 110 may be needed to unlock the compressed archive 100. It is understood that compressed archive 100 may be stored on a computer-readable storage medium for storing data or intructions, as is known in the art.

As shown in this illustration, compressed archive 100 comprises a decompressor 40, and payload 50. In some embodiments, portions of payload 50 may be encrypted (as encrypted payload 50a) or unencrypted (as unencrypted payload 50b), or both.

In some embodiments, password 110 and cyclic redundancy code (CRC) support may be added for greater security and reliability. Cyclic redundancy checks are known in the art, as a method of verifying data integrity. Such embodiments may also include cyclic redundancy calculator 10, comparer 20, payload decryptor 30, decompressor 40, an encrypted CRC of a document session key, a CRC code of the payload 50, and an encrypted document session key 80. Collectively, cyclic redundancy calculator 10, comparer 20, payload decryptor 30, decompressor 40, are known as "extraction code." In some embodiments, extraction code may be implemented in Java, JavaScript or ActiveX. Other embodiments may implement the extraction code in any other platform-independent executable form known in the art. The function of these structures may best be understood with respect to the flowchart of FIGS. 3A-3B, as described below.

Figure 3A:
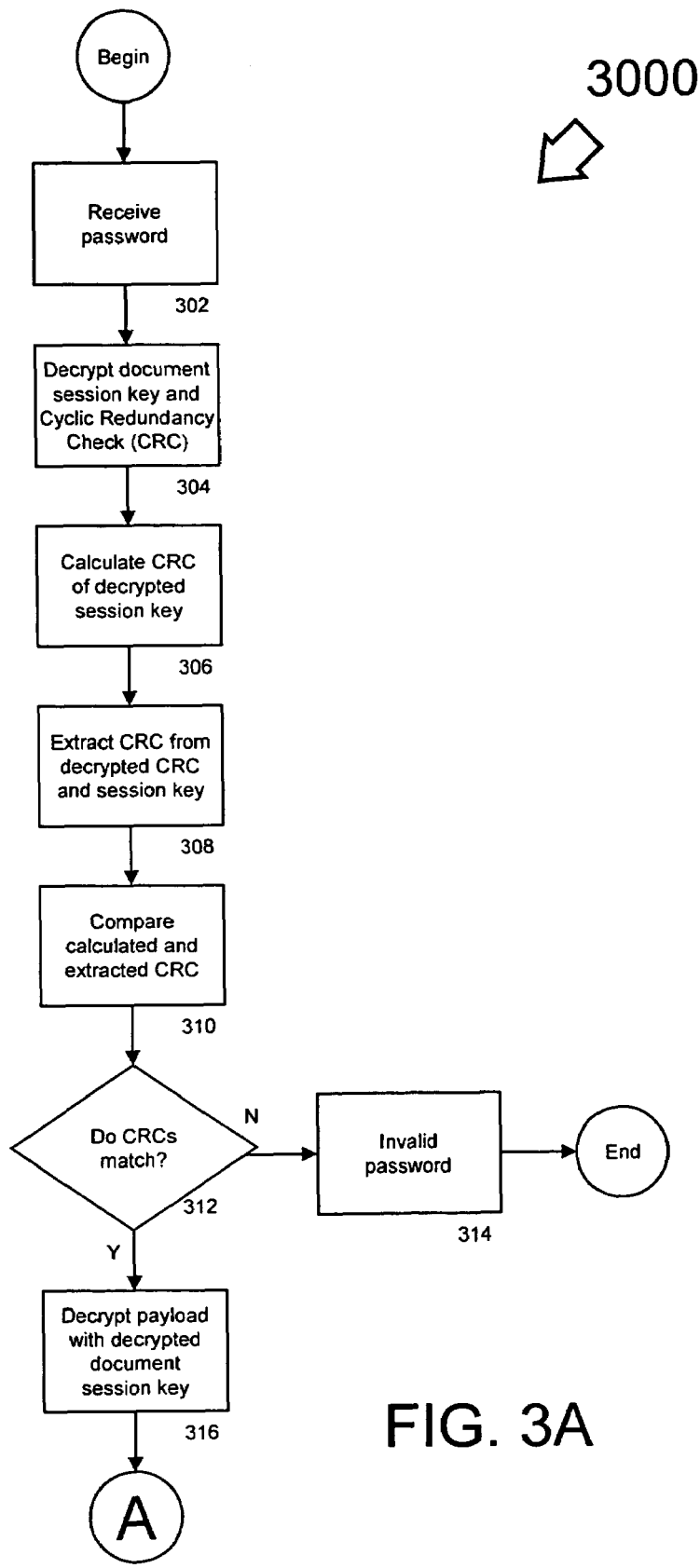
FIGS. 3A-3B are a flow chart of a platform-independent method embodiment of self-extracting a compressed archive.
Figure 3B:
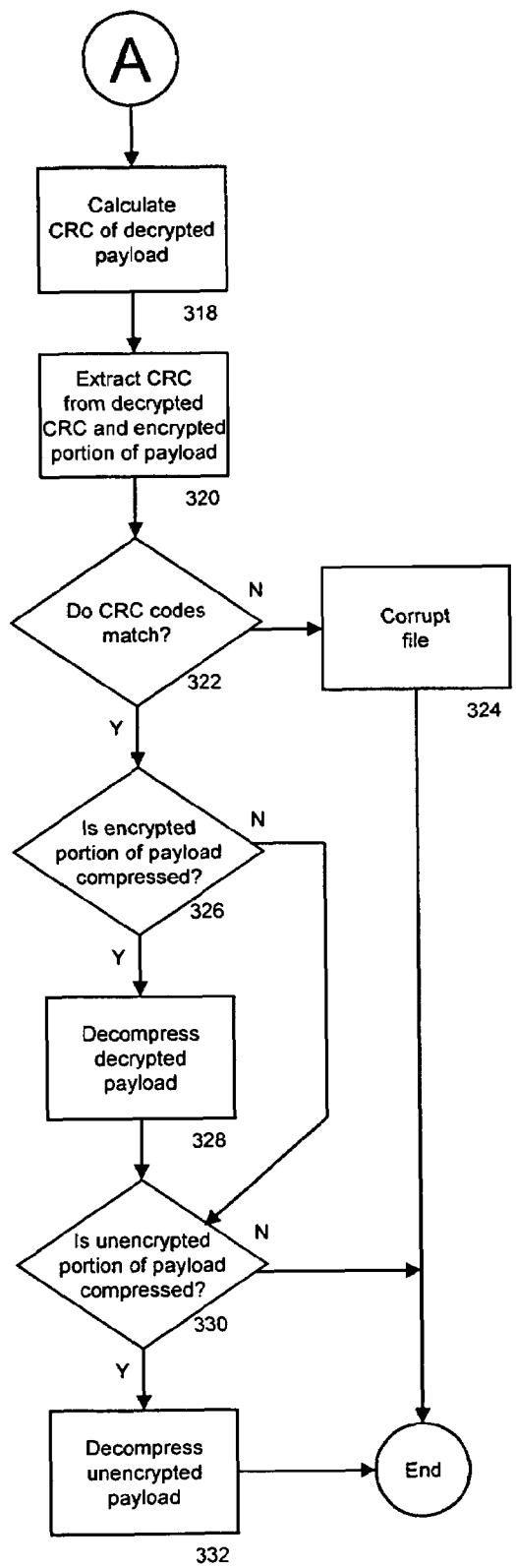

Turning now to FIGS. 3A-3B, a flow chart of a method embodiment of self-extracting a compressed archive 100 is depicted, constructed and operative in accordance with an embodiment of the present invention.

At block 302, process 3000 receives a password 110. Using password 110, a payload decryptor 30 decrypts a stored encrypted document session key 80 and cyclic redundancy check of the document session key 60, block 304. Payload decryptor 30 may use a variety of encryption algorithms, including, but not limited to: ARC4, AES, RSA, 3DES, DSA, Skipjack, Blowfish, Two-Fish, or any other encryption algorithm known in the art.

Cyclic redundancy calculator 10 performs a cyclic redundancy check of the decrypted session key, block 306, and then extracts a cyclic redundancy check from the decrypted CRC and session key 60, at block 308. In some embodiments, cyclic redundancy calculator 10 may perform a hash instead of a cyclic redundancy check. A hash is another type of checksum; typically, a hash algorithm accepts a block of data (e.g. the contents of a file) and generates a small block of data that is derived from the input block. Hashes have the property that it is extremely difficult to find an input block that matches a given hash.

The calculated and extracted CRCs of the session key are compared at block 310, by comparer 20. If the calculated and extracted checks match, as determined at block 312, a correct password 110 was given, and flow continues at block 316. Otherwise, an invalid password was entered, and an "invalid password" message is displayed at block 314.

At block 316, payload decryptor 30 decrypts the encrypted portion of the payload 50a.

Cyclic redundancy calculator 10 performs a cyclic redundancy check of the decrypted payload 50, block 318.

Cyclic redundancy calculator 10 extracts a cyclic redundancy check of the payload 70 at block 320. If this value does not match the calculated result from block 318, as determined at block 322, a "file corrupted" message is displayed, at block 324, and the process ends.

If the two values match, as determined at block 322, process 3000 knows that the file payload has not been corrupted, and the payload may be decompressed. If the encrypted portion of the payload is compressed, block 326, the decrypted payload is decompressed, block 328. If the unencrypted portion of the payload is compressed, as determined at block 330, it too is decompressed, at block 332, and may be deposited on to computer-readable storage medium 220.

Process 3000 then ends.

Figure 2:
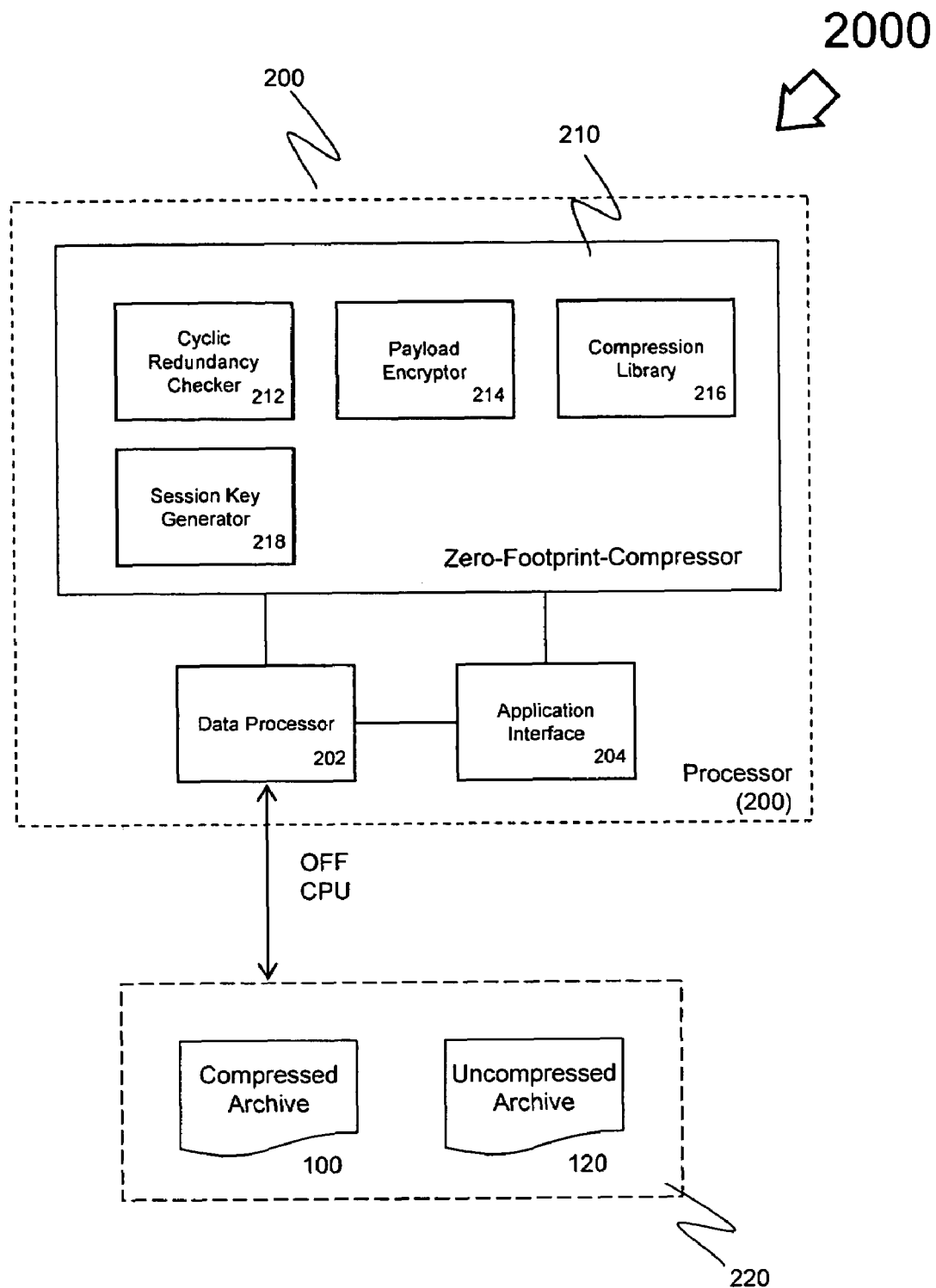
FIG. 2 is a block diagram of an apparatus embodiment that compresses a file or group of files into a platform-independent self-extracting archive.

Embodiments will now be disclosed with reference to a functional block diagram of an exemplary encryption device 2000 of FIG. 2, constructed and operative in accordance with an embodiment of the present invention. Encryption device 2000 comprises a processor 200 and computer-readable medium 220. Processor 200 may be any processing device known in the art, such as a microprocessor, micro-controller, mainframe, or other computing device as is known in the art, and may run an operating system (OS). It is understood, by those familiar with the art, that the computing power of processor 200 may be distributed throughout a device or a system of devices without inventive faculty.

The software for programming the processor 200 may be found at the computer-readable storage medium 220, or across a data network.

It is well understood by those in the art, that the functional elements of FIG. 2 may be implemented in hardware, firmware, or as software instructions and data encoded on the computer-readable storage medium 220. As shown in FIG. 2, processor 200 is functionally comprised of a zero-footprint-compressor 210, data processor 202, and an application interface 204.

The data processor 202 enables processor 200 to locate data on, read data from, and write data components connected to processor via a computer bus or the like.

Application interface 204 enables processor 200 to take some action with respect to a separate software application or entity. For example, application interface 204 may take the form of a windowing call recipient interface, as is commonly known in the art.

Zero-footprint-compressor 210 may further comprise: cyclic redundancy checker 212, payload encryptor 214, compression library 216, and session key generator 218. These structures may be implemented as hardware, firmware, or software encoded on a computer readable medium, such as storage media 220. In addition, as shown in FIG. 2, storage media 220 may also contain compressed archive 100, and uncompressed archive 120. The function of these structures may best be understood with respect to the flowchart of FIG. 4, as described below.

Figure 4:
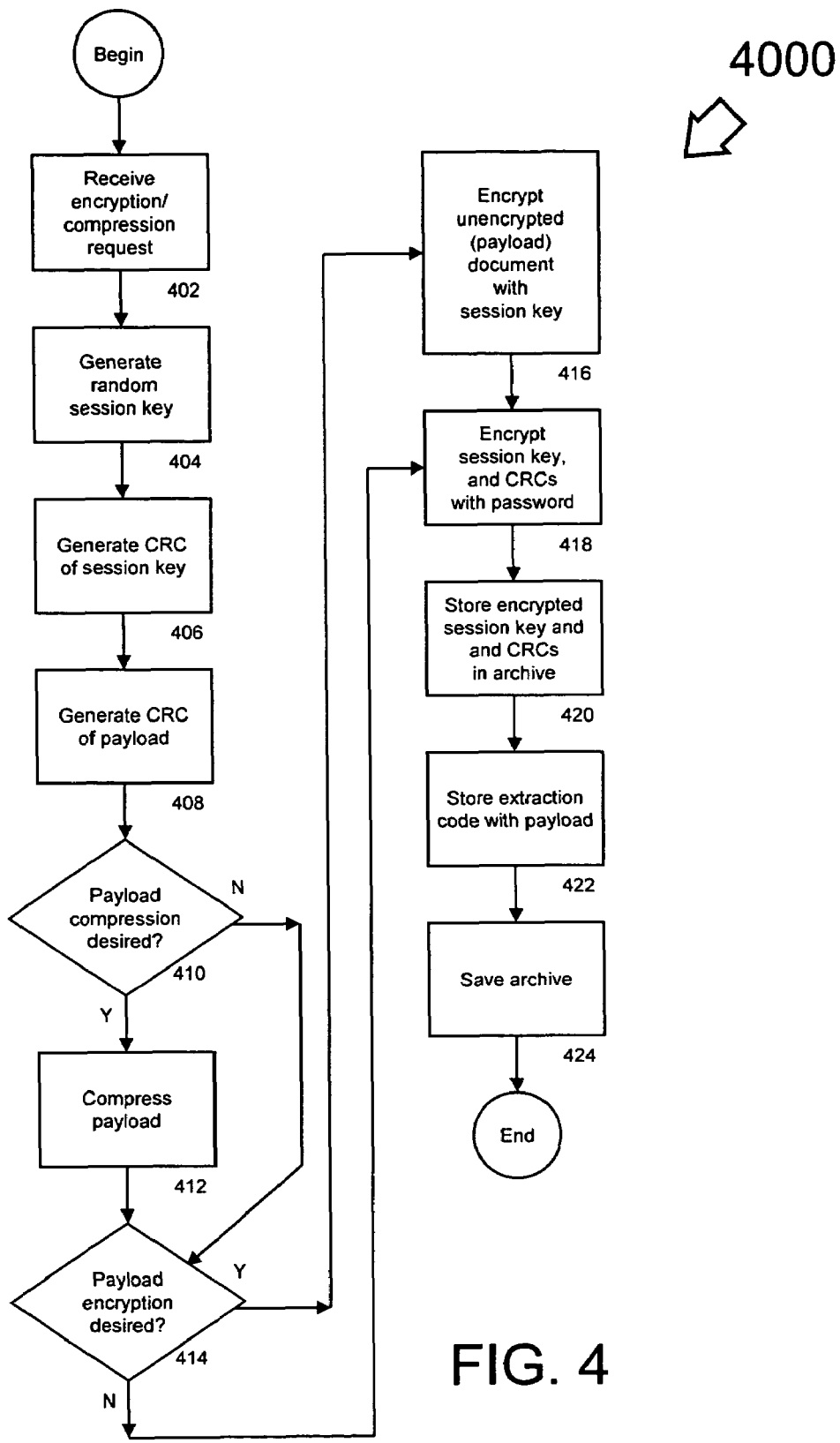
FIG. 4 is a flow chart of a method embodiment of generating a platform-independent self-extracting compressed archive.

FIG. 4 flowcharts process 4000, a method of generating a platform-independent self-extracting compressed archive, constructed and operative in accordance with an embodiment of the present invention.

At block 402, process 4000 receives a request to compress an archive, file or other list of documents. Session key generator 218 generates a random session key, block 404. Any random key generation algorithm known in the art may be used. In theory, it does not matter how the random session key is generated, and a variety of different random key generator algorithms may be used depending upon the system design tradeoffs made. For example, in a Java embodiment, Java's Random, which is a standard linear congruential method, or a Java SecureRandom("SHA1PRNG") instance, which generates repeated SHA-1 hashes of a seed, may be used. The former algorithm is faster, although the latter is more secure.

A cyclic redundancy checker 212 performs a cyclic redundancy check on the session key, block 406, and payload, block 408.

If payload compression is not desired, as determined at block 410, flow continues at block 414. If payload compression is desired, compression library 216 compresses the payload. Compression library 216 compresses the payload 50 and stores it in the archive 100. In some embodiments compression library 216 utilizes the zLib algorithm for compression. It is understood that any lossless data compression algorithm known in the art may be used. Such embodiments include, but are not limited to: run-length encoding, Huffman encoding, delta encoding, Lempel-Ziv compression, Lempel-Ziv-Welch encoding, or any other compression method known in the art. Additionally, compression library 216 may use any archive format, including, but not limited to: ARJ, ARJ SFX, ARC, ARC SFX, BH, BH SFX, CAB, ENC, GZip (gz,z), HA, LHA, LZH, LZH SFX, PAK, PAK SFX, RAR, RAR SFX, TAR, UUE, XXE, ZIP, ZIP SFX, ZIP250, ZIP250 SFX, ZOO, or any other archive format known in the art.

If payload encryption is not desired, as determined at block 414, flow continues at block 418. If payload encryption is desired, payload compressor 214 compresses the payload with the session key, block 416.

At block 418, the session key and cyclic redundancy checks are encrypted with a provided password.

The encrypted session key 80, and encrypted CRCs 60, 70 are stored in the archive 100, at block 420.

Executable extraction code 10-40 (collectively, cyclic redundancy calculator 10, comparer 20, payload decryptor 30, decompressor 40) are inserted into the archive, block 422. The archive is saved at block 424.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A method of extracting information, the method comprising:
   receiving a self-executing file, the file comprising an encrypted document session key, an encrypted stored session key cyclic redundancy check, a payload and an extractor;
   using the extractor, from the self-executing file, to decrypt the encrypted document session key with a password, resulting in an unencrypted document session key;
   using the extractor, from the self-executing file, to decrypt the encrypted stored session key cyclic redundancy check with the password, resulting in an unencrypted stored session key cyclic redundancy check;
   performing a cyclic redundancy check on the unencrypted document session key, resulting in a cyclic redundancy check on the unencrypted document session key;
   using the extractor, from the self-executing file, to extract the payload with the extractor when the cyclic redundancy check on the unencrypted document session key matches the unencrypted stored session key cyclic redundancy check, wherein the extractor is platform independent.

2. The method of claim 1, further comprising:
   calculating a cyclic redundancy check on the payload.

3. The method of claim 2, further comprising:
   decrypting a stored payload cyclic redundancy check found in the self-executing file.

4. The method of claim 3, further comprising:
   alerting of a corrupted payload when the cyclic redundancy check on the payload does not match the stored payload cyclic redundancy check found in the file.

5. The method of claim 4, wherein the decryption of the document session key uses: ARC4, AES, RSA, 3DES, DSA, Skipjack, Blowfish, or Two-Fish algorithms.

6. The method of claim 4, wherein the extraction of the payload uses: run-length encoding, Huffman encoding, delta encoding, Lempel-Ziv compression, or Lempel-Ziv-Welch encoding.

7. The method of claim 4, further comprising:
   decrypting the payload.

8. The method of claim 1, wherein the extractor uses Java, JavaScript or ActiveX.

9. A computer-readable medium encoded with a self-executing file, the file comprising:
   an encrypted document session key;
   an encrypted stored session key cyclic redundancy check;
   a payload;
   an extractor configured to unencrypt the encrypted stored session key cyclic redundancy check, resulting in a stored session key cyclic redundancy check, configured to unencrypt the encrypted document session key, resulting in an unencrypted document session key, to perform a cyclic redundancy check on the unencrypted document session key, and configured to extract the payload from the file when the cyclic redundancy check on the unencrypted document session key matches the stored session key cyclic redundancy check, and the extractor is platform independent.

10. The computer-readable medium of claim 9, further comprising:
    a cyclic redundancy checker configured to calculate a cyclic redundancy check on the payload.

11. The computer-readable medium of claim 10, further comprising an instruction to: decrypt a stored payload cyclic redundancy check found in the file.

12. The computer-readable medium of claim 11, further comprising an instruction to:
    alert of a corrupted payload when the cyclic redundancy check on the payload does not match the stored payload cyclic redundancy check found in the file.

13. The computer-readable medium of claim 12, wherein the decryption of the document session key uses:
    ARC4, AES, RSA, 3DES, DSA, Skipjack, Blowfish, or Two-Fish algorithms.

14. The computer-readable medium of claim 12, wherein the extraction of the payload uses: run-length encoding, Huffman encoding, delta encoding, Lempel-Ziv compression, or Lempel-Ziv-Welch encoding.

15. The computer-readable medium of claim 12, further comprising an instruction to:
    decrypt the payload.

16. The computer-readable medium of claim 9, wherein the extractor uses Java, JavaScript or ActiveX.

17. A method of depositing a payload in a self-executing file, comprising:
    generating a session key;
    encrypting the session key with a password;
    calculating a cyclic redundancy check on the session key, resulting in a session key cyclic redundancy check;
    storing the payload, the encrypted session key and the cyclic redundancy check of the session key in the self-executing file;
    storing a platform independent extractor, the extractor configured to extract the payload, in the self-executing file.

18. The method of claim 17, further comprising:
    encrypting the session key cyclic redundancy check.

19. The method of claim 18, further comprising:
    calculating a cyclic redundancy check on the payload;
    encrypting the cyclic redundancy check on the payload; and
    storing the cyclic redundancy check on the payload in the self-executing file.

20. The method of claim 19, wherein the encryption of the session key uses:
    ARC4, AES, RSA, 3DES, DSA, Skipjack, Blowfish, or Two-Fish algorithms.

21. The method of claim 20, wherein the storing of the payload uses: run-length encoding, Huffman encoding, delta encoding, Lempel-Ziv compression, or Lempel-Ziv-Welch encoding.

22. The method of claim 18, further comprising: encrypting the payload.

23. The method of claim 17, wherein the extractor uses Java, JavaScript or ActiveX.

24. A method of depositing a payload in a self-executing file, comprising:
    generating a session key;
    encrypting the session key with a password;
    cyclic redundancy checking the session key, resulting in a session key cyclic redundancy check;

encrypting the session key cyclic redundancy check with the password;

storing the encrypted session key, encrypted session key cyclic redundancy check, and the payload in the self-executing file;

storing a platform independent extractor, the extractor configured to extract the payload, in the self-executing file.

25. The method of claim 24, further comprising:

calculating a cyclic redundancy check on the payload; encrypting the cyclic redundancy check on the payload; and storing the cyclic redundancy check on the payload in the self-executing file.

26. The method of claim 25, wherein the encryption of the session key uses:

ARC4, AES, RSA, 3DES, DSA, Skipjack, Blowfish, or Two-Fish algorithms.

27. The method of claim 26, wherein the storing of the payload uses: run-length encoding, Huffman encoding, delta encoding, Lempel-Ziv compression, or Lempel-Ziv-Welch encoding.

28. The method of claim 25, further comprising: encrypting the payload.

29. The method of claim 24, wherein the extractor uses Java, JavaScript or ActiveX.

30. A computer-readable storage medium, storing data and instructions, that when the instructions are executed by a computer, causes the computer to:

generate a session key;

encrypt the session key with a password;

cyclic redundancy check the session key, resulting in a session key cyclic redundancy check;

encrypt the session key cyclic redundancy check with the password;

store the encrypted session key, encrypted session key cyclic redundancy check, and a payload in a self-executing file;

store a platform-independent extractor, the extractor configured to extract the payload, in the self-executing file.

31. The computer-readable storage medium of claim 30, further comprising instruction to:

calculate a cyclic redundancy check on the payload;

encrypt the cyclic redundancy check on the payload; and store the cyclic redundancy check on the payload in the self-executing file.

32. The computer-readable storage medium of claim 31, wherein the encryption of the document session key uses: ARC4, AES, RSA, 3DES, DSA, Skipjack, Blowfish, or Two-Fish algorithms.

33. The computer-readable storage medium of claim 32, wherein the storing of the payload uses: run-length encoding, Huffman encoding, delta encoding, Lempel-Ziv compression, or Lempel-Ziv-Welch encoding.

34. The computer-readable storage medium of claim 31, further comprising:

encrypting the payload.

35. The computer-readable storage medium of claim 30, wherein the extractor uses Java, JavaScript or ActiveX.

36. A system to generate a self-extracting file, comprising:

a session key generator configured to generate a session key;

a cyclic redundancy code generator configured to cyclic redundancy check the session key, resulting in a session key cyclic redundancy check;

an encryptor configured to encrypt the session key with a password and to encrypt the session key cyclic redundancy check;

a compression library configured to store the encrypted session key, encrypted session key cyclic redundancy check, a payload, and a platform-independent extractor, the extractor configured to extract the payload, in the self-executing file.

37. The system of claim 36, wherein the cyclic code redundancy generator is further configured to calculate a cyclic redundancy check on the payload, and to encrypt the cyclic redundancy check on the payload; and wherein the compression library is further configured to store the cyclic redundancy check on the payload in the self-executing file.

38. The system of claim 37, wherein the encryptor uses: ARC4, AES, RSA, 3DES, DSA, Skipjack, Blowfish; or Two-Fish algorithms.

39. The system of claim 38, wherein the compression library uses: run-length encoding, Huffman encoding, delta encoding, Lempel-Ziv compression, or Lempel-Ziv-Welch encoding.

40. The system of claim 37, wherein the encryptor is further configured to encrypting the payload.

41. The system of claim 36, wherein the extractor uses Java, JavaScript or ActiveX.

* * * * *